United States Patent
Moraal et al.

(10) Patent No.: US 6,276,139 B1
(45) Date of Patent: Aug. 21, 2001

(54) AUTOMOTIVE ENGINE WITH CONTROLLED EXHAUST TEMPERATURE AND OXYGEN CONCENTRATION

(75) Inventors: Paul Eduard Moraal, Wurselen; Brendan Patrick Carberry, Aachen, both of (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/526,359

(22) Filed: Mar. 16, 2000

(51) Int. Cl.$^7$ ............................ F02B 33/44
(52) U.S. Cl. ................ 60/605.2; 60/606; 60/611
(58) Field of Search ............... 60/605.1, 605.2, 60/606, 611

(56) References Cited

U.S. PATENT DOCUMENTS

| | | |
|---|---|---|
| 4,215,550 | 8/1980 | Dinger et al. . |
| 4,244,187 | 1/1981 | Lane et al. . |
| 4,356,696 * | 11/1982 | Mason .......................... 60/606 |
| 4,404,805 * | 9/1983 | Curtil ............................ 60/606 |
| 4,517,802 * | 5/1985 | Kobayashi et al. ............ 60/606 |
| 4,615,172 | 10/1986 | Mayer . |
| 4,616,481 | 10/1986 | Melchior et al. . |
| 4,622,816 | 11/1986 | Boudigues . |
| 4,785,635 | 11/1988 | Melchior et al. . |
| 4,833,886 | 5/1989 | Meier . |
| 5,036,668 | 8/1991 | Hardy . |
| 5,406,796 * | 4/1995 | Hiereth et al. ............. 60/606 X |
| 5,724,813 | 3/1998 | Fenelon et al. . |

FOREIGN PATENT DOCUMENTS 9-049419    4/1999   (JP) .

* cited by examiner

Primary Examiner—Hoang Nguyen
(74) Attorney, Agent, or Firm—Jerome P. Drouillard

(57) ABSTRACT

An arrangement of an internal combustion engine 7 is provided. In a preferred embodiment, the internal combustion engine 7 has at least one variable working and combustion chamber 12. A first passage 14 is provided for delivering air to the combustion chamber 12. A second passage 26 is provided for delivering exhaust from the combustion chamber 12. A turbocharger is provided. The turbocharger has a compressor 18 with an outlet 16 fluidly connected with the first passage 14. The turbocharger has a turbine inlet 28 fluidly connected with the second passage 26. An exhaust 29 of the turbine is connected with a third passage 30. A first bypass passage 70 is provided between the first passage 14 and the third passage 30. A first valve 72 controls the flow of air through the first bypass passage between the first passage 14 and the third passage 30. The bypass passage 70 allows for greater control of the engine exhaust temperature and oxygen concentration allowing the engine to be more suitable for utilization with aftertreatment devices such as particulate filters 34, oxygen catalysts 40, or NOx catalysts 44.

21 Claims, 3 Drawing Sheets

US 6,276,139 B1

AUTOMOTIVE ENGINE WITH CONTROLLED EXHAUST TEMPERATURE AND OXYGEN CONCENTRATION

FIELD OF THE INVENTION

The field of the present invention is that of automotive engines, particularly low emission turbo-charged diesel engines and methods of operation thereof. The diesel engine arrangement of the present invention has particular application in small diesel engines used to power passenger cars, sport utility vehicles and pickup trucks.

BACKGROUND OF THE INVENTION

Emission-after-treatment devices, such as particulate filters, oxidation catalysts and NOx catalysts, require certain conditions in the engine exhaust in order to perform optimally. In particular, NOx catalysts have a relatively narrow temperature window within which the conversion efficiency is sufficiently high. Diesel particulate filters require sufficient oxygen in order to maintain regeneration at high engine loads. Prior to the present invention, the required exhaust gas conditions could not always be achieved during normal operation of the engine. In particular, at high engine loads, it was difficult if not impossible to provide sufficiently high levels of oxygen required by the particulate filter. Also the exhaust gas temperature could only be influenced to a certain degree by the combustion system.

BRIEF SUMMARY OF THE INVENTION

The present invention entails an engine arrangement with a bypass from a turbocharger compressor outlet directly into the exhaust system downstream of a turbocharger turbine. An electrically or pneumatically actuated control valve controls the flow of air through the bypass. The bypass is preferably used in conjunction with an actively controlled wastegate or a variable geometry turbocharger. The bypass allows for the introduction of the relatively cool air into the exhaust that leads to a reduction of the exhaust gas temperature and increased oxygen concentration. In combination with an actively controlled wastegate or a variable geometry turbocharger, the present invention allows for simultaneous control of oxygen content, exhaust temperature and boost pressure at relatively low cost. For engines equipped with a NOx catalyst, the invention enables control of the exhaust gas temperature so as to stay within the narrow temperature window with high catalyst conversion efficiency. For engines equipped with a particulate filter, the invention enables control of the exhaust gas oxygen content so as to supply sufficient oxygen to the filter during a regeneration event.

These and other features and advantages of this invention will become apparent to one skilled in the art from the following detailed description and the accompanying drawings illustrating features of this invention by way of example.

DETAILED DESCRIPTION OF THE INVENTION

Figure 1:
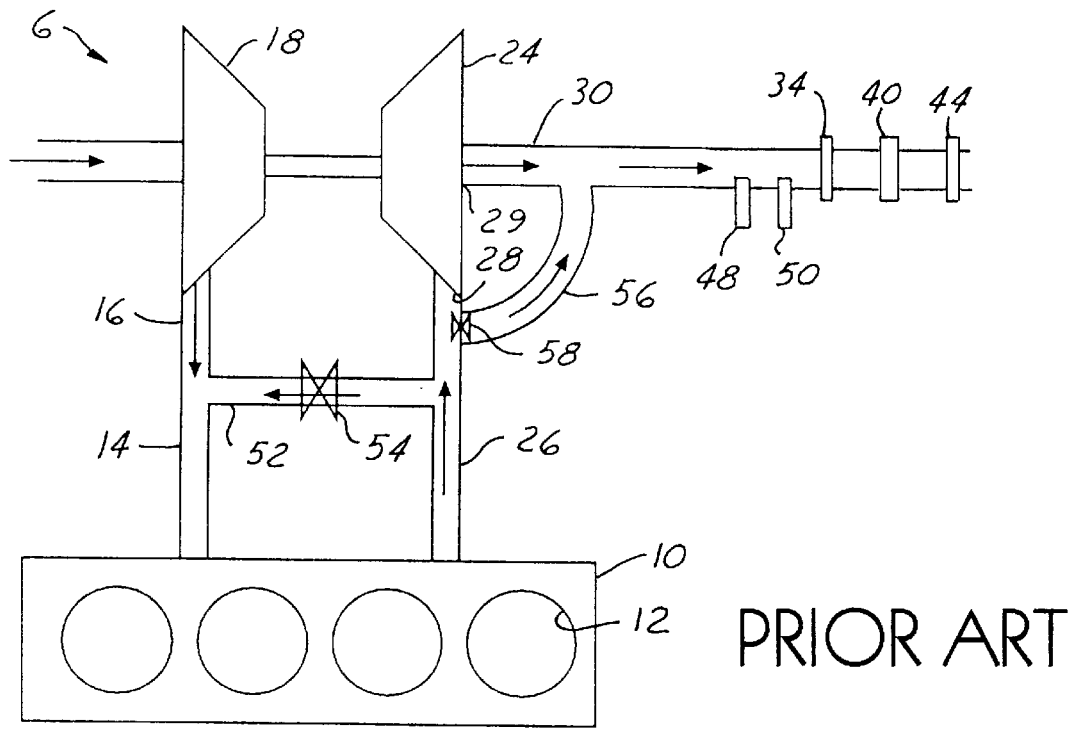
FIG. 1 is a schematic view of a prior art turbo-charged diesel engine arrangement.

FIG. 1 schematically represents a prior internal combustion engine arrangement 6, having an engine block 10. The engine block 10 has a plurality of cylindrical work and combustion chambers 12. Reciprocally mounted to each chamber 12 is a piston (not shown). The chambers 12 by appropriate valving (not shown) are fluidly connected with a first compressed air inlet passage 14. The inlet passage 14 is fluidly connected with an outlet 16 of a turbocharger compressor 18.

To allow for the delivery of exhaust gas from the chambers 12 via appropriate valving (not shown), there is a second passage 26. The second passage 26 is also fluidly connected with an inlet 28 of a turbocharger turbine 24. An outlet 29 of the turbine 24 is fluidly connected with a third passage 30. The third passage 30 is fluidly connected with a particulate filter 34, an oxidation catalyst 40 and a NOx catalyst 44. Prior to passing through the oxidation catalyst 40 the exhaust will be exposed to an exhaust temperature sensor 48 and an exhaust oxygen concentration sensor 50. To allow for the recirculation of exhaust from the second passage 26 into the first passage 14 there is provided an EGR bypass passage 52. Controlling the flow of exhaust through the EGR bypass passage 52 is an EGR valve 54. The engine arrangement 6 additionally has a wastegate bypass passage 56. A wastegate valve 58 controls the exhaust flow between the second passage 26 and the third passage 30. The wastegate valve 58 accordingly controls the amount of exhaust gas that flows through the inlet 28 of the turbine 24.

Figure 2:
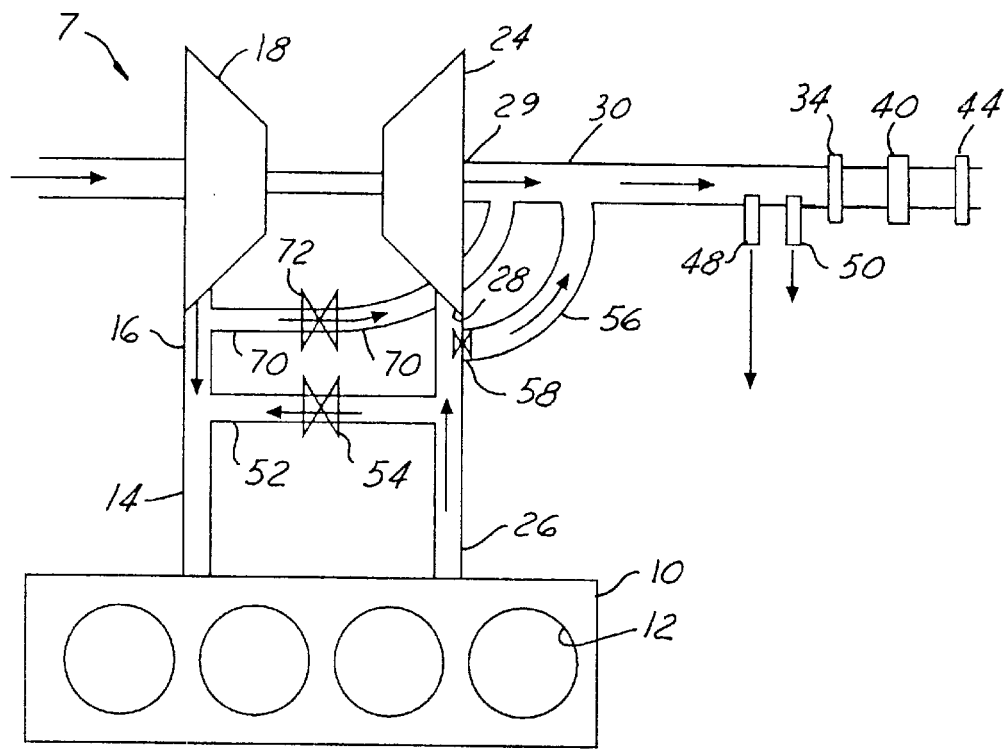
FIG. 2 is a schematic view of a preferred embodiment of a diesel engine arrangement according to the present invention.

Referring to FIG. 2, an automotive vehicle internal combustion diesel engine arrangement 7 is shown according to the present invention. Like items are given reference numbers similar to those shown in FIG. 1. The engine arrangement 7 additionally has a first bypass passage 70. The bypass passage 70 connects the first passage 14 with the third passage 30 bypassing both the engine block 10 and the turbine 24. The connection of the bypass passage 70 with the first passage 14 is located upstream of the connection of the EGR bypass passage 52 with the first passage 14. To control the flow of air through the bypass passage 70 there is a control value 72. Control valve 72 can be electrically or pneumatically actuated. Typically the connection of the bypass passage 70 with the third passage 30 will be upstream of the connection of the wastegate passage 56 with the third passage 30. The bypass passage 70 allows the introduction of fresh air into the third passage 30 to increase the levels of oxygen in the exhaust. Additionally, the introduction of relatively cold air into the exhaust leads to a lowering of the exhaust gas temperature. The control value 72 can be operated to provide a desired temperature in the third passage 30 in response to the difference between the measured temperature in the third passage 30 (downstream of any mixing point) and a desired exhaust gas temperature.

Simultaneously or alternatively the control valve 72 can be operated in response to the measured oxygen concentration (downstream of any mixing point) in the third passage 30 to provide a desired oxygen concentration. An advantage of the diesel engine arrangement 7 is that the operation of the valve 72 provides for simultaneous control of the oxygen content exhaust temperature and boost pressure at relatively low cost. The bypass passage 70 also functions as a wastegate to prevent over-boosting at high engine loads. Since the pressure at the compressor outlet 16 is generally considerably higher than the turbine outlet 29 pressure, appropriate sizing of the bypass passage 70 can insure that there is always sufficient flow of fresh air into the exhaust stream within the third passage 30. The control valve 72 is placed in the clean fresh air environment instead of in an exhaust cooling loop as the EGR valve 54 and is not exposed to contamination and hot exhaust fumes.

Figure 3:
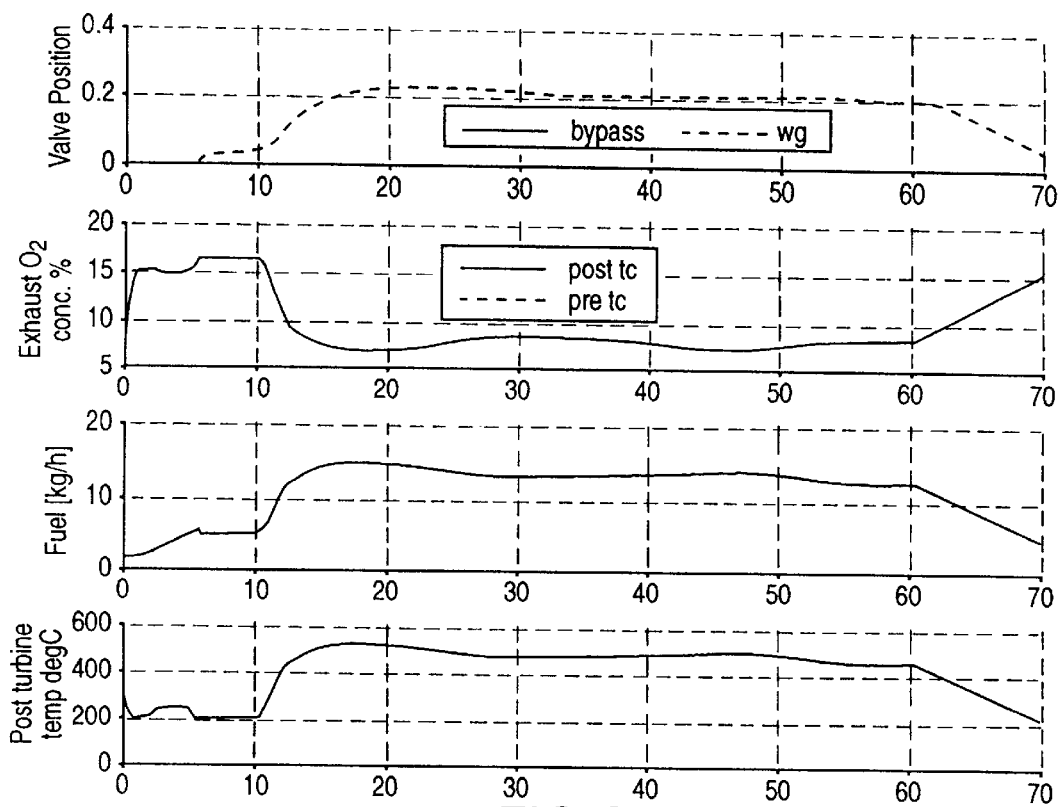
FIG. 3 is an illustration of a simulation of high engine load operation of the diesel engine shown schematically in FIG. 1 demonstrating the relationships between wastegate valve position, exhaust oxygen concentration, fuel consumption and exhaust gas temperature.

Referring to FIG. 3, a simulation of high engine load (200 Nm) of engine arrangement 6 with wastegate control only, is presented. The wastegate valve 58 is used to keep the boost pressure below a specified level of 160 kPa. The first or top graph of FIG. 3 illustrates the wastegate valve 58 position between closed (0) and totally open (1) positions. The second graph of FIG. 3 illustrates the oxygen concentration in the exhaust as measured by the oxygen concentration sensor 50. The third graph of FIG. 3 shows fuel consumption in kilograms per hour. The fourth or lowest graph of FIG. 3 shows the exhaust temperature measured by the sensor 48.

Figure 4:
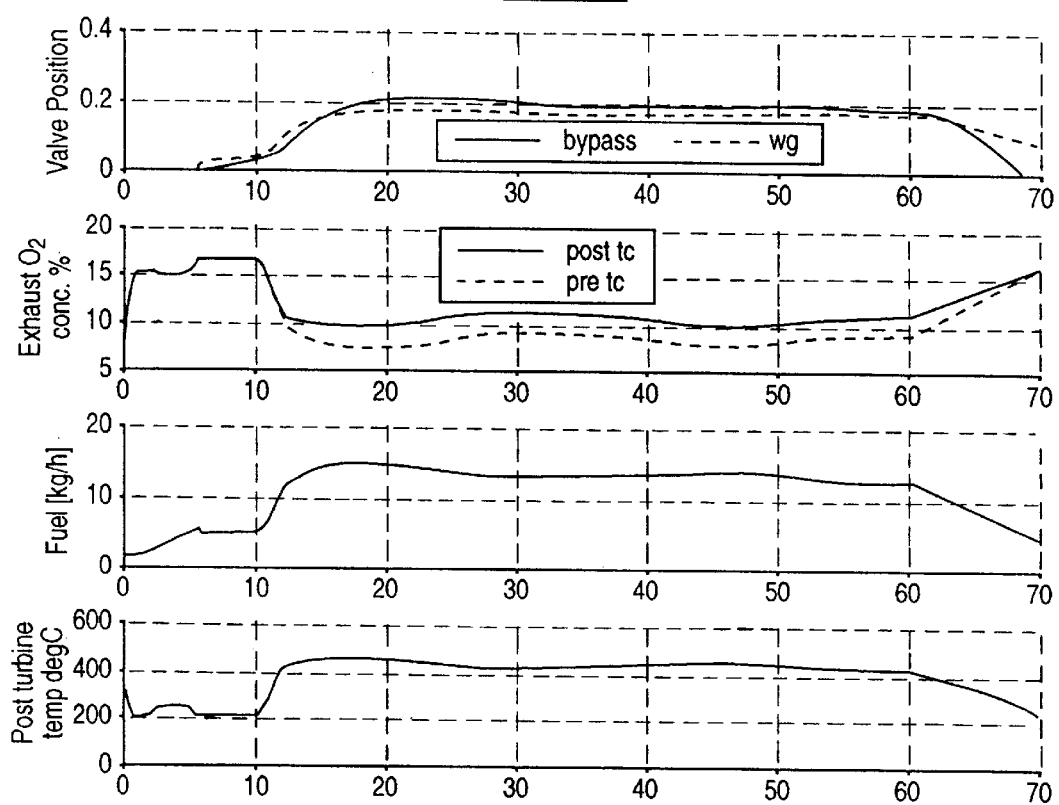
FIG. 4 is an illustration of a simulation of high engine load operation of the diesel engine arrangement according to the present invention shown in FIG. 2 demonstrating relationships between bypass valve and wastegate valve position, exhaust oxygen concentration, fuel consumption, and exhaust gas temperature.

Referring to the simulation shown in FIG. 4 (of the current invention shown in FIG. 2) and comparing it to the simulation of FIG. 3, it is evident that the exhaust gas temperature is significantly lowered. As shown in FIG. 4, the oxygen concentration is increased while there is virtually no fuel consumption penalty. Utilizing other control strategies, the temperature and exhaust oxygen concentration can be controlled to different levels than those illustrated.

In an alternative embodiment of the present invention (not shown), oxygen concentration is not measured at all. The control valve 72 is controlled in an open-loop fashion using predetermined maps that define oxygen concentration.

Figure 5:
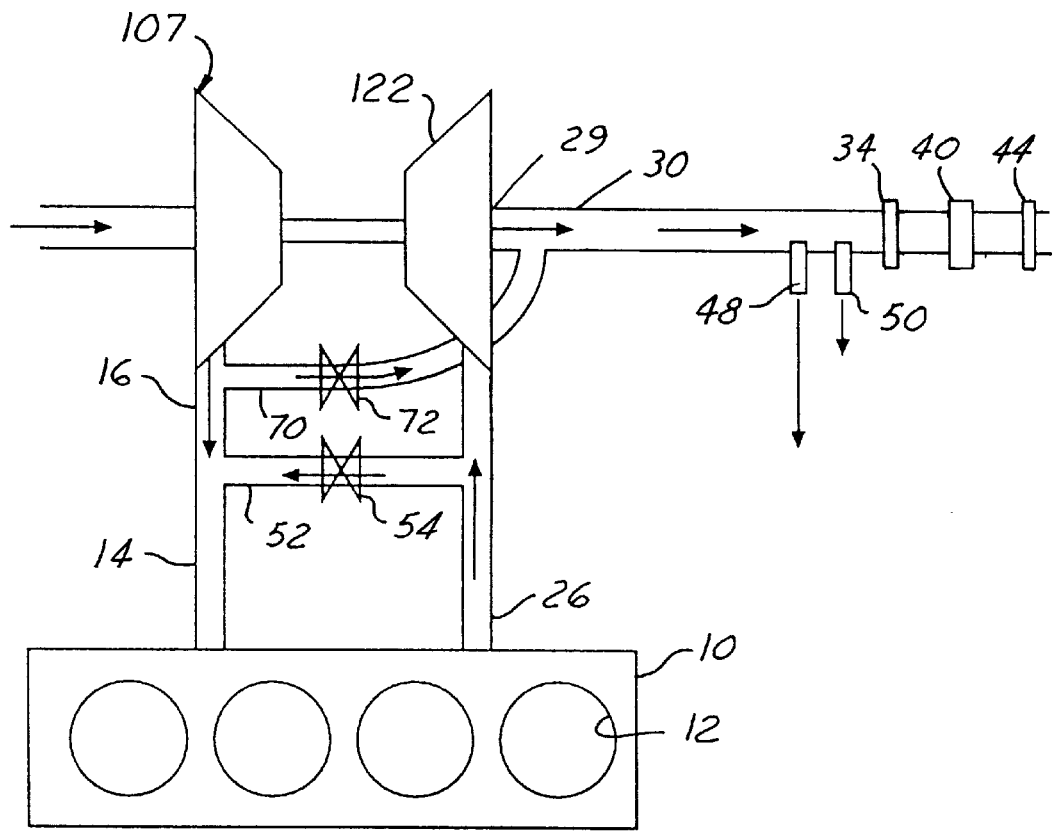
FIG. 5 is a partial schematic view similar to that of FIG. 2 illustrating an alternative preferred embodiment of the diesel engine arrangement of the present invention.

Referring to FIG. 5, an embodiment 107 of the present invention is provided with a variable geometry turbocharger 122. The use of the variable geometry turbocharger can optionally eliminate the wastegate bypass passage 56 and valve 58 to achieve results essentially similar to those explained for the embodiments of the present invention illustrated in FIGS. 2 and 4.

While the invention has been particularly shown and described with reference to preferred embodiments thereof, it is well understood by those skilled in the art that various changes and modifications can be made in the invention without departing from the spirit and the scope of the invention.

We claim:

1. An arrangement of an internal combustion engine comprising:
   at least one variable volume working and combustion chamber;
   a first passage for delivering air to said combustion chamber;
   a second passage for delivering exhaust from said combustion chamber;
   a turbocharger having a compressor with an outlet fluidly connected with said first passage, said turbocharger having a turbine fluidly connected with said second passage and a turbine exhaust third passage; and
   a first bypass passage between said first passage and said third passage; and
   a first valve controlling the flow of air through said first bypass passage between said first passage and said third passage responsive to a condition in said third passage to provide a desired condition in said third passage.

2. An arrangement of an internal combustion engine as described in claim 1, with the addition of an EGR bypass passage connecting said second passage with said first passage, said first bypass passage being connected with said first passage upstream of said connection of said EGR bypass passage with said first passage, said EGR bypass passage having an EGR valve controlling flow from said second passage to said first passage.

3. An arrangement of an internal combustion engine as described in claim 1, wherein there is a wastegate bypass between said second passage and said third passage and a wastegate valve to control flow from said second passage to said third passage.

4. An arrangement of an internal combustion engine as described in claim 1, wherein said turbocharger is a variable geometry turbocharger.

5. An arrangement of an internal combustion engine as described in claim 1, wherein the temperature of said exhaust gas in said third passage is determined by a map and said first valve is operated to provide a desired temperature.

6. An arrangement of an internal combustion engine as described in claim 1, wherein the concentration of oxygen in said passage is determined by a map and said first valve is operated to provide a desired concentration of oxygen in said third passage.

7. An arrangement of an internal combustion engine as described in claim 1, wherein said first valve is pneumatically actuated.

8. An arrangement of an internal combustion engine as described in claim 1, wherein said first valve is electrically actuated.

9. An arrangement of an internal combustion engine as described in claim 1, wherein the temperature of said exhaust gas in said third passage is measured and said first valve is operated to provide a desired temperature.

10. An arrangement of an internal combustion engine as described in claim 1, wherein the concentration of oxygen in said third passage is measured and said first valve is operated to provide a desired concentration of oxygen in said third passage.

11. An arrangement of an internal combustion engine as described in claim 1, wherein said combustion chamber has a diesel combustion cycle.

12. A diesel engine arrangement comprising:
   a plurality of variable volume working and combustion chambers;
   a first passage for delivering air to said combustion chambers;
   a second passage for delivering exhaust from said combustion chambers;
   a turbocharger having a compressor with an outlet fluidly connected with said first passage, said turbocharger having a turbine with an inlet fluidly connected with said second passage and an outlet fluidly connected with a third passage;
   an EGR bypass passage connecting said second passage with said first passage;
   an EGR valve within said EGR passage controlling flow of exhaust from said second passage to said first passage;

a first bypass passage between said first passage and said third passage, said first bypass passage fluidly connecting with said first passage upstream of said EGR bypass passage in connection with said first passage; and a first valve controlling flow of air from said first passage to said third passage through said first bypass passage responsive to a condition of said third passage to provide a desired condition in said third passage.

13. A diesel engine arrangement as described in claim 12, wherein said turbocharger is a variable geometry turbocharger.

14. A diesel engine arrangement as described in claim 13, wherein said first valve is pneumatically actuated.

15. A diesel engine arrangement as described in claim 12, wherein said first valve is electrically actuated.

16. A diesel engine arrangement as described in claim 12, wherein said condition of said third passage is a temperature of said exhaust gas in said third passage.

17. A diesel engine arrangement as described in claim 12, wherein said condition of said third passage is a concentration of oxygen in said third passage.

18. A method of operating an internal combustion engine with at least one variable volume working and combustion chamber, said method comprising:

fluidly connecting a first passage with said combustion chamber to deliver air to said combustion chamber;

fluidly connecting said combustion chamber with a second passage for delivering exhaust from said combustion chamber;

delivering compressed air to said first passage utilizing a compressor of a turbocharger;

delivering said exhaust of said combustion chamber through said second passage to an inlet of a turbine of said turbocharger;

connecting an exhaust of said turbocharger turbine with a third passage;

treating for emissions said combustion chamber exhaust delivered from said third passage;

bypassing some of said air from said first passage to said third passage; and valving said air delivered from said first passage to said third passage in a response to a condition of said exhaust in said third passage.

19. A method as described in claim 18, wherein said valve is operated to control a measured temperature in said third passage to a desired predetermined temperature.

20. A method as described in claim 18, wherein said first valve is operated to control the oxygen content within said third passage at a desired amount.

21. A method as described in claim 18, wherein said internal combustion engine is operated as a diesel engine.

* * * * *